Feb. 17, 1959
W. MANN ET AL
2,873,821
COMBINATION BRAKE
Filed Dec. 12, 1955
2 Sheets-Sheet 1
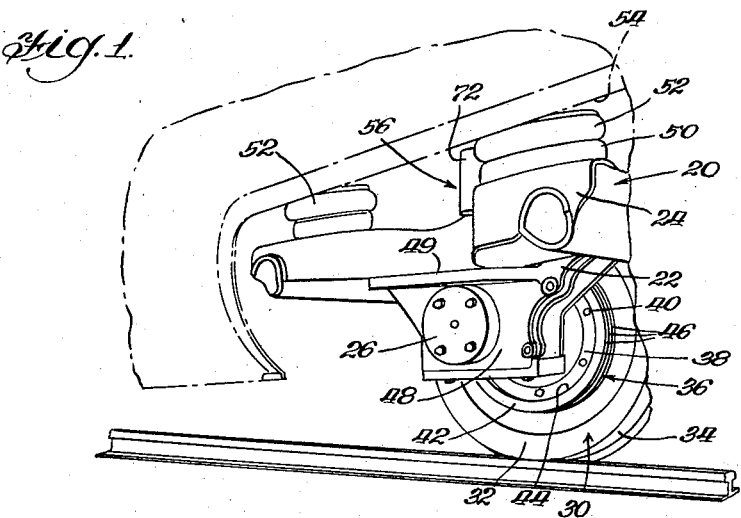
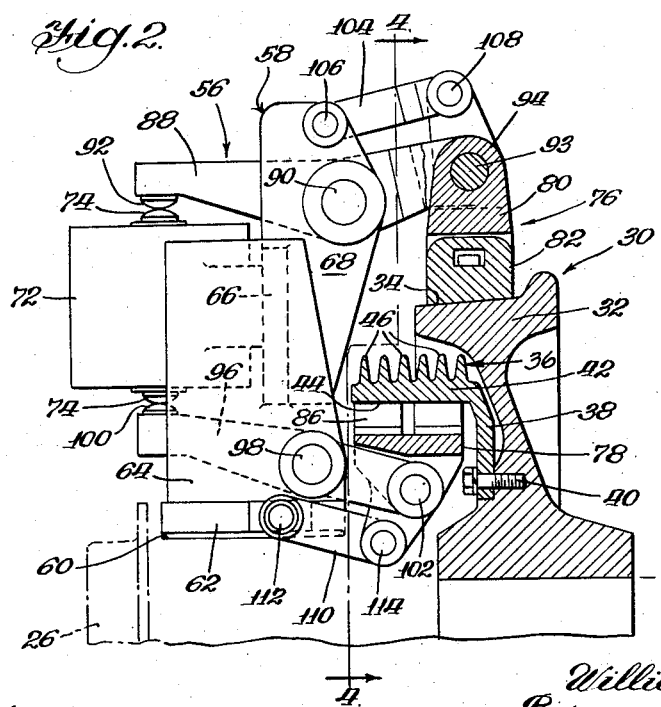
INVENTORS.
William Mann
Bernard Maloney
By Walter J. Schlegel Jr. Atty.
Witness:
Richard W Carpenter

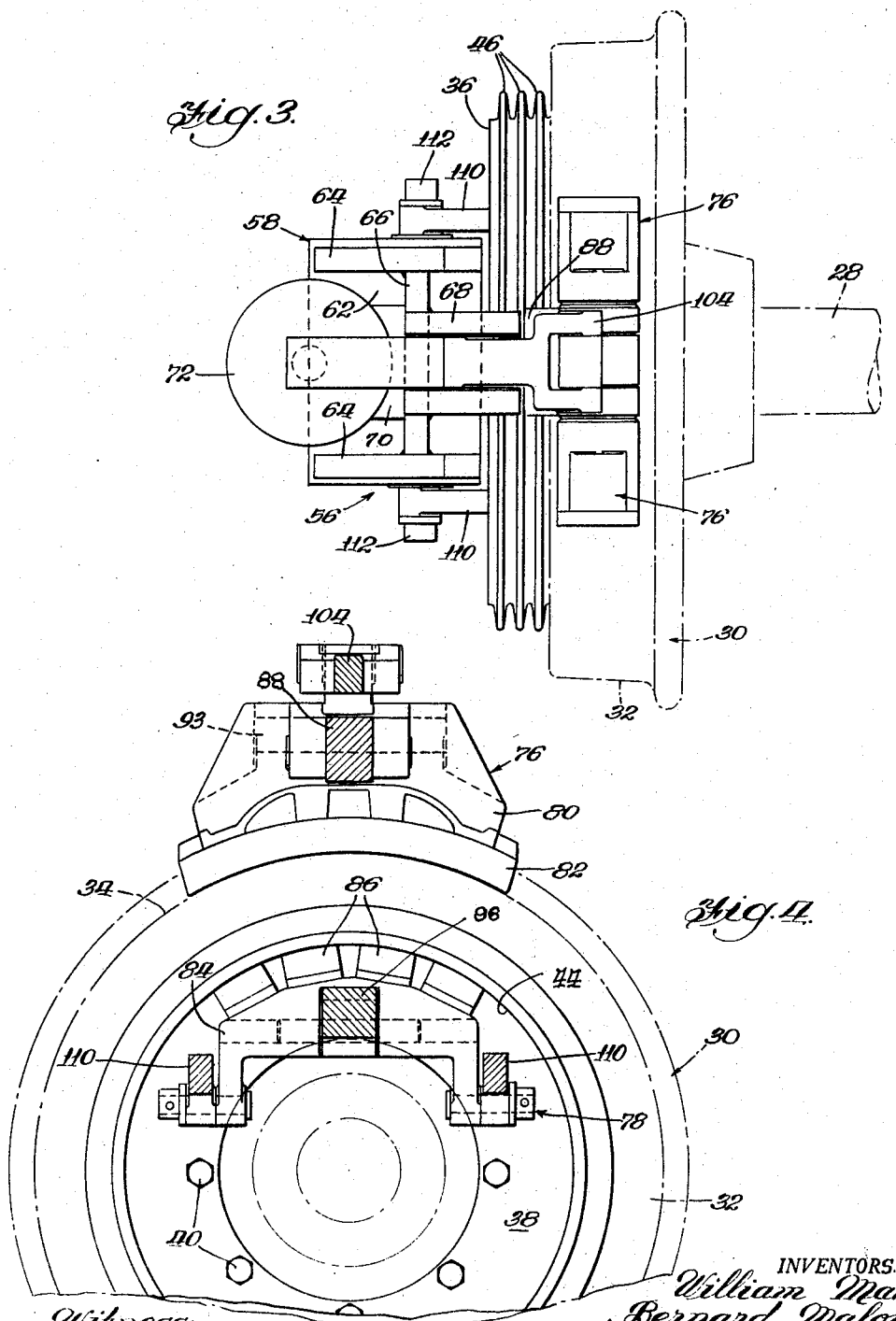

United States Patent Office 2,873,821
Patented Feb. 17, 1959

2,873,821
COMBINATION BRAKE

William Mann and Bernard Maloney, Gary, Ind., assignors to American Steel Foundries, Chicago, Ill., a corporation of New Jersey Application December 12, 1955, Serial No. 552,306

11 Claims. (Cl. 188—33)

This invention relates to brake arrangements and more particularly to a brake arrangement for a railway car truck.

The invention comprehends an arrangement wherein a tread type brake and a drum type brake are employed in combination with each other.

The use of nonmetallic brake shoes on a wheel tread has not proven practical because the intense heat generated by frictional engagement causes rapid disintegration of the shoes. Many attempts have been made to provide an arrangement wherein an off-wheel brake such as a drum, disc or rotor, which can be air cooled, is engaged by the brake shoes. With this type of brake, non-metallic shoes can be utilized successfully. However, the use of off-wheel brakes alone for railway cars has not proven entirely satisfactory for many reasons. One of the greatest disadvantages of employing an off-wheel brake alone is that the treads of the wheels are not kept free of foreign matter, as they are when engaged by cast iron brake shoes. It is necessary to maintain a clean surface on the wheels in order that they may make rail contact with electric circuits for signals.

It is, therefore, a primary purpose of this invention to provide a brake arrangement combining the advantages of both the tread and off-wheel systems.

Another object of the invention is to provide a brake arrangement particularly adapted for use in a light weight high speed railway car supported by two-wheel type car trucks.

Another object of the invention is the provision of a combination brake wherein both elements are operated by the same power means and have a common supporting structure and linkage.

A further object of the invention is the provision of a combination brake wherein the brake supporting structure is carried by the journal means of the side member outboardly of the wheels to render it readily accessible at all times.

These and other objects of the invention will be apparent from an examination of the following description and drawings, wherein:

Figure 1 is a fragmentary side elevational view of a portion of a railway car embodying the invention;

Figure 2 is a fragmentary elevational view of the structure illustrated in Figure 1, with a portion of the structure shown in section;

Figure 3 is a fragmentary plan view of the structure illustrated in Figure 2; and Figure 4 is a fragmentary side elevational view of the structure illustrated in Figure 2 with portions of the structure shown in a vertical section taken along line 4—4 of Figure 2.

It will be noted that certain elements have been omitted from certain views where they are illustrated to better advantages in other views of the drawings.

Referring now to the drawings for a better understanding of the invention, it will be seen that the novel brake arrangement is shown as applied to a railway car supported at either end by a light weight two-wheel car truck. Of course, it will be understood that the invention may be applied to other types of car trucks.

As best seen in Figure 1, the truck indicated generally at 20 comprises a pair of spaced side members or wheel pieces 22 (only one of which is shown) which may be interconnected by a pair of transverse beams 24.

The side members present journal box portions 26 which receive and house the ends of axle 28 of wheel and axle assembly 30.

Each wheel and axle assembly 30 comprises a pair of wheels 32 which present an outer peripheral tread or friction surface 34. Positioned outboardly adjacent each wheel 32 is a drum 36 which comprises a central arcuate web portion 38 rigidly secured to the adjacent wheel as by stud bolts 40. An outboardly extending flange 42 preferably formed integrally with the peripheral edge of web 38 presents an inner friction surface 44. The outer surface of the flange may be provided with axially spaced annular peripheral cooling fins 46 which serve to increase the rate of cooling of the drum. Referring to Figure 1, it will be seen that side member 20 comprises a vertical section 48 which contains the journal portion 26 and which has preferably formed integrally therewith and extending outboardly therefrom in a substantially horizontal plane, a shelf portion 49.

The shelf portion is provided with a plurality of spaced seats 50 for retaining car supporting springs 52 which engage the underside of the car body at 54. Although in the embodiment illustrated, pneumatic spring means are employed to support the car body, the invention is not restricted to any particular type of spring arrangement and is equally adaptable to a conventional car truck which supports a car body from a transversely extending bolster.

The novel brake mechanism indicated generally at 56 as best seen in Figures 2 and 3 is supported by a brake frame or bracket 58 which may be mounted and rigidly secured to the journal portion 26 of the side member as by welds 60. The brake frame comprises a generally horizontal base plate or floor 62 having spaced vertical outside walls 64 upstanding therefrom and positioned at the outer sides thereof. Outer side walls 64 as best seen in Figure 3 are interconnected by a traverse wall or flange 66 which has secured thereto a pair of spaced vertical inner walls 68 extending inboardly therefrom between outer walls 64. A mounting bracket 70 may be secured to the outboard side of transverse wall 66 to retain a power cylinder 72 in such a position that its operating or longitudinal axis lies in a substantially vertical plane normal to base plate 62. The power cylinder is preferably of the duplex type having a pair of opposed pistons 74.

Referring now to Figure 4, it will be seen that deceleration is achieved by external contracting and internal expanding wheel and drum brake assemblies 76 and 78, respectively. Wheel brake shoe assembly 76 preferably comprises a brake head 80 having a metallic brake shoe 82 secured thereto in the usual manner for engagement with outer peripheral friction surface 34 of wheel 32. Drum brake shoe assembly 78 preferably comprises a brake head 84 having a plurality of preferably nonmetallic friction shoes or pads 86 bonded thereto for engagement with the inner peripheral friction surface 44 of the drum.

The wheel brake shoe assembly is operatively connected to the power cylinder by means of a wheel brake lever 88 pivoted intermediate its ends by pin 90 to inner vertical walls 68 and having formed at its outboard end a boss 92 engageable with upper power cylinder piston 74. The preferably bifurcated inboard end of the brake lever is movably secured by pin 93 to lug 94 of wheel brake head 80.

The drum brake shoe assembly is operatively connected to the power cylinder by means of a drum brake lever 96 pivoted intermediate its ends to outer vertical walls 64 and having formed at its outboard end a boss 100 engageable with lower power cylinder piston 74. The inboard end of the lever is pivoted by pin 102 to drum brake head 84.

To maintain parallel fixed engagement between the brake shoes and the respective friction surfaces of the wheel and drum, a set of links may be employed to interconnect the brake frame and the brake shoe assemblies. Upper wheel link 104 is disposed above lever 88 and pivoted by pin 106 at its outboard end to inner vertical wall 68 and at its preferably bifurcated inboard end by pin 108 to wheel brake head lug 94. Lower spaced drum links 110 are pivoted by pins 112 at their outboard ends to outer vertical walls 64 and at their inboard ends by pins 114 to drum brake head 84.

In order to afford added structural rigidity for the arrangement and to transmit the braking torque from the brake mechanism, a pair of torque arms (not shown) may be employed to interconnect the brake mechanism with the car body itself.

To describe the operation of the invention, referring again to Figure 2, it will be understood that as the upper and lower pistons 74 of the power cylinder are energized, wheel and drum brake levers 88 and 96 will be urged to rotate clockwise and counterclockwise about pivotal points 90 and 98, respectively, to carry wheel and drum brake shoe assemblies 76 and 78 into frictional engagement with the related outer and inner peripheral friction surfaces of the wheel and drum.

We claim:

1. A brake arrangement for a vehicle having a supported member and a supporting wheel and axle assembly with a rotatable drum secured thereto and nonrotatable journal means receiving the ends of said assembly, comprising, in combination: a brake frame mounted on said journal means outboardly of a wheel of said assembly, a duplex power cylinder mounted on said frame and having its longitudinal axis substantially normal to the rotational axis of said assembly, said drum being rigidly secured to said wheel outboardly thereof, said drum having an internal peripheral friction surface coaxial with a wheel tread friction surface, a pair of dead brake levers fulcrumed intermediate their ends to the frame and having their respective outboard ends operatively connected to the power cylinder at opposite ends of said cylinder, friction means pivoted to the inboard ends of the brake levers and engageable with the friction surfaces of the wheel and drum, respectively, and links pivotally interconnecting each of the brake means to the frame to maintain parallel engagement between the brake means and the related friction surfaces.

2. A brake arrangement for a vehicle having a supported member and a supporting wheel and axle assembly with a rotatable drum secured thereto and nonrotatable journal means receiving the ends of said assembly, comprising, in combination: a brake frame mounted on said journal means, power cylinder means mounted on said frame, said drum having an internal cylindrical friction surface coaxial with a wheel tread friction surface of said assembly, friction means engageable with each of said friction surfaces, brake levers fulcrumed to the frame and operatively connecting the respective friction means to opposite ends of the power cylinder means, and means interconnecting said friction means and said brake frame to insure parallel engagement between the friction means and the respective friction surfaces.

3. A brake arrangement for a vehicle having a supported member and a supporting wheel and axle assembly with a rotatable drum secured outboardly thereto, comprising, in combination: journal means receiving the ends of said wheel and axle assembly, a brake frame mounted on the journal means, said brake frame being disposed outboardly of a wheel of said assembly, a power cylinder supported by the brake frame, the longitudinal axis of said power cylinder being disposed normal to the rotational axis of said assembly along a diameter of said wheel, friction means engageable with a friction surface of the wheel, other friction means engageable with an internal cylindrical surface of the drum, brake levers pivoted to the frame and operatively connecting the respective friction means to the power cylinder.

4. A brake arrangement for a vehicle having a wheel and axle assembly and journal means receiving the ends of said assembly, a friction surface presented by a tread surface of a wheel of said assembly, a drum rigidly secured to said assembly outboardly of said wheel and rotatable therewith, said drum presenting an inner cylindrical friction surface, support means on said journal means, power means disposed outboardly of said wheel and carried by the support means, a brake shoe assembly engageable with each friction surface, and lever means fulcrumed intermediate its ends to the support means and connecting each brake shoe assembly to the power means.

5. In a brake arrangement for a vehicle having a wheel with a tread surface and having a drum with an internal substantially cylindrical surface; the combination of a brake frame carried by the vehicle, a pair of brake levers fulcrumed to the frame, friction means operatively connected to one lever for actuation thereby to engage said tread surface, friction means operatively connected to the other lever for actuation thereby to engage said internal surface, and a power cylinder device having its longitudinal axis approximately normal to the rotational axis of the wheel, said device being operatively connected to said levers for actuation thereof.

6. In a brake arrangement for a vehicle having a wheel with a wheel tread friction surface, and a rotatable drum secured to said wheel outboardly thereof, said drum comprising an internal cylindrical friction surface; the combination of a brake frame carried by the vehicle outboardly the wheel, a duplex power cylinder mounted on said frame and having its longitudinal axis substantially normal to the rotational axis of said wheel, a pair of brake levers fulcrumed to said frame, said brake levers having corresponding ends directly connected to opposite ends of said duplex power cylinder, friction means directly connected to the other corresponding ends of said brake levers, said friction means being engageable with said wheel tread friction surface and said cylindrical friction surface respectively.

7. In a brake arrangement for a railway car truck having a wheel and axle assembly and a journal box carried by said assembly; the combination of power means carried by the box, a rotatable tread surface on a wheel of said assembly, a brake drum carried by the wheel, said drum having an internal substantially cylindrical surface, said surfaces being disposed substantially parallel to the rotational axis of said assembly and being radially aligned relative to said axis, a pair of oppositely acting brake means intersected by a radius struck from said rotational axis and operatively connected to said power means, said brake means being engageable with portions of respective surfaces, means connected to said power means and brake means for exerting equalized decelerating forces to said surfaces through said brake means, said forces being exerted in opposite directions along said radius to prevent unbalanced decelerating forces from acting on said surfaces transversely of said axis, said brake means being the sole means for decelerating rotation of said surfaces.

8. In a brake arrangement for a railway car truck having a wheel and axle assembly and having nonrotatable journal means carried by said assembly and supporting a railway car; the combination of: a drum secured to said assembly for rotation therewith, an internal substantially cylindrical friction surface in said drum, a wheel tread surface on a wheel of said assembly, brake means engageable with said surfaces along portions thereof disposed entirely at one side of a plane parallel to and passing along the rotational axis of said assembly, said brake means being in alignment radially with respect to said axis and being the sole means for decelerating rotation of said surfaces, and means carried by said journal means for actuating said brake means, said actuating means comprising means for equalizing pressure of said brake means against respective surfaces to prevent unbalanced force components from acting on said surfaces transversely of said axis.

9. In a brake arrangement for a railway car truck having a wheel and axle assembly, journal means housing an end of the axle of said assembly, brake support means carried by said journal means, power means carried by said support means, a wheel tread friction surface disposed on a wheel of said assembly, a drum secured to said wheel outboardly thereof and having an internal cylindrical friction surface, friction shoes engageable with said surfaces, said friction shoes being movable toward each other to apply decelerating forces to said surfaces, said friction shoes being radially aligned with respect to the rotational axis of said assembly, brake levers operatively interconnecting the friction shoes and said power means, and links pivotally interconnecting the friction shoes and said support means to maintain parallel engagement between the friction shoes and their respective surfaces, said friction shoes and power means being entirely disposed at one side of a plane disposed substantially parallel to and passing through said axis, said decelerating forces acting along a plane disposed perpendicular to the first-mentioned plane and passing through said rotational axis.

10. In a brake arrangement for a railway car truck having a wheel and axle assembly, journal means housing an end of the axle of said assembly, a drum secured to said assembly and rotatable therewith, an internal cylindrical surface in said drum, a wheel tread surface on a wheel of said assembly, friction shoe assemblies engageable with portions of said surfaces, said shoe assemblies being entirely disposed at one side of a plane passing through and disposed substantially parallel to the rotational axis of said wheel and axle assembly, said shoe assemblies being in radial alignment relative to said axis, said shoe assemblies being the sole means to decelerate said surfaces, brake levers carried by said journal means and connected to respective shoe assemblies, and a power cylinder carried by said journal means, said power cylinder being operatively connected to said levers to transmit equalized decelerating forces through said shoe assemblies against said portions of the surfaces, said forces being radially aligned relative to said axis.

11. In a brake arrangement for a railway car truck having a wheel and axle assembly including a journal box, a rotatable drum secured to said assembly for rotation therewith, said drum having an internal substantially cylindrical friction surface therein, a wheel tread friction surface on said assembly, brake means acting in opposite directions and engaging portions of said surfaces, a power cylinder operatively carried by the journal box, opposed pistons in said cylinder, a pair of levers operatively carried by the journal box and operatively interconnecting said brake means and respective pistons, said brake means, said power cylinder and said levers being entirely disposed on one side of a plane passing through and disposed substantially parallel to the rotational axis of said assembly, said brake means being intersected by a plane normal to and passing through said axis, said pistons transmitting equalized pressures through said brake means to apply equal decelerating forces to said surfaces, said forces acting along the second-mentioned plane to thereby prevent unbalanced decelerating forces from acting on said assembly.

References Cited in the file of this patent

UNITED STATES PATENTS

| | | |
|---|---|---|
| 1,397,059 | Scott | Nov. 15, 1921 |
| 1,572,872 | Alben | Feb. 16, 1926 |
| 2,056,219 | Stout et al. | Oct. 6, 1936 |
| 2,148,791 | Whitney | Feb. 28, 1939 |
| 2,198,027 | Farmer | Apr. 23, 1940 |
| 2,248,383 | Pogue et al. | July 8, 1941 |
| 2,272,647 | Simanek | Feb. 10, 1942 |
| 2,352,222 | Pogue et al. | June 27, 1944 |